(12) United States Patent
Shaw et al.

(10) Patent No.: US 12,262,224 B2
(45) Date of Patent: Mar. 25, 2025

(54) MEASURING A NETWORK PERFORMANCE CHARACTERISTIC

(71) Applicant: SPATIALBUZZ LIMITED, Guildford (GB)

(72) Inventors: Ryan Dominic Shaw, Guildford (GB); Andrew Robert Blake, Guildford (GB)

(73) Assignee: SPATIALBUZZ LIMITED, Guildford (GB)

( * ) Notice: Subject to any disclaimer, the term of this patent is extended or adjusted under 35 U.S.C. 154(b) by 0 days.

(21) Appl. No.: 17/271,520

(22) PCT Filed: Aug. 28, 2019

(86) PCT No.: PCT/GB2019/052404
§ 371 (c)(1),
(2) Date: Feb. 25, 2021

(87) PCT Pub. No.: WO2020/044040
PCT Pub. Date: Mar. 5, 2020

(65) Prior Publication Data
US 2022/0240105 A1 Jul. 28, 2022

(30) Foreign Application Priority Data
Aug. 31, 2018 (GB) ................................. 1814215

(51) Int. Cl.
*H04W 24/02* (2009.01)
*H04L 43/0894* (2022.01)
*H04M 1/72403* (2021.01)

(52) U.S. Cl.
CPC ......... *H04W 24/02* (2013.01); *H04L 43/0894* (2013.01); *H04M 1/72403* (2021.01)

(58) Field of Classification Search
CPC ............. H04L 43/0876; H04L 41/5032; H04L 41/5067; H04L 43/065; H04L 43/067;
(Continued)

(56) References Cited

U.S. PATENT DOCUMENTS

| 6,571,285 B1 * | 5/2003 | Groath | .................... H04L 43/00 709/224 |
| 8,850,008 B2 * | 9/2014 | Kotecha | ............. H04L 43/0876 709/225 |

(Continued)

FOREIGN PATENT DOCUMENTS

| EP | 2723034 | 4/2014 | | |
| WO | WO-0147187 A2 * | 6/2001 | ......... | H04L 41/0631 |
| WO | WO-0245315 A2 * | 6/2002 | ......... | G06Q 30/0283 |

OTHER PUBLICATIONS

GB Examination Report for GB1814215.8 dated Mar. 11, 2020 (4 pages).
(Continued)

*Primary Examiner* — Matthew C Sams
(74) *Attorney, Agent, or Firm* — Aikin & Gallant, LLP (57) ABSTRACT

A method of operating a user equipment configured for use with a communications network is provided. The method comprises measuring a network performance characteristic associated with a measurement period, and identifying, using historical data, an application on the UE responsible for transmitting data to, and/or receiving data from, the communication network in the measurement period. The identity of the identified application is then associated with the network performance characteristic.

17 Claims, 5 Drawing Sheets

(58) Field of Classification Search
CPC ....... H04L 43/106; H04L 43/16; H04L 43/18; H04L 67/125; H04L 67/535; H04L 67/75; H04L 43/0894; H04W 24/08; H04W 24/10; H04W 36/0058; H04W 36/0094; H04W 36/04; H04W 36/30; H04W 8/26; H04W 36/0055; H04W 24/02; H04M 1/72403

See application file for complete search history.

(56) References Cited

U.S. PATENT DOCUMENTS

| | | | | |
|---|---|---|---|---|
| 9,253,663 | B2* | 2/2016 | Raleigh | H04W 24/02 |
| 9,351,193 | B2* | 5/2016 | Raleigh | H04M 15/705 |
| 9,578,182 | B2* | 2/2017 | Raleigh | H04L 12/14 |
| 2012/0054661 | A1* | 3/2012 | Rados | H04L 67/75 |
| | | | | 709/224 |
| 2013/0196616 | A1* | 8/2013 | Zalmanovitch | H04M 15/854 |
| | | | | 455/405 |
| 2013/0198374 | A1* | 8/2013 | Zalmanovitch | H04M 15/846 |
| | | | | 709/224 |
| 2014/0032656 | A1* | 1/2014 | Hyman | H04L 67/535 |
| | | | | 709/224 |
| 2014/0036697 | A1 | 2/2014 | Annan et al. | |
| 2015/0127819 | A1* | 5/2015 | Cimino | H04L 67/125 |
| | | | | 709/224 |
| 2016/0261472 | A1* | 9/2016 | Tubi | H04L 43/0876 |
| 2017/0086053 | A1* | 3/2017 | Zalmanovitch | H04L 43/062 |
| 2017/0188273 | A1* | 6/2017 | Yiu | H04W 24/10 |
| 2019/0205839 | A1* | 7/2019 | Dotan-Cohen | H04L 67/535 |
| 2021/0099363 | A1* | 4/2021 | Leemet | H04M 15/58 |
| 2022/0240105 | A1* | 7/2022 | Shaw | H04M 1/72403 |

OTHER PUBLICATIONS

Search Report from Great Britain Intellectual Property Office for GB 1814215.8, dated Feb. 2, 2019. 1 page.
International Search Report and Written Opinion of International Application No. PCT/GB2019/052404, dated Mar. 5, 2020. 12 pages.

* cited by examiner

MEASURING A NETWORK PERFORMANCE CHARACTERISTIC

CROSS REFERENCE TO RELATED APPLICATIONS

The present application is a National Phase Entry of International Application No. PCT/GB2019/052404, entitled ⬜ MEASURING A NETWORK PERFORMACE CHARACTERISTIC⬜ and filed on Aug. 28, 2019, which claims priority to Great Britain Application No. 1814215.8, filed Aug. 31, 2018 and entitled ⬜ Measuring a network performance characteristic,⬜ both of which are incorporated by reference herein in their respective entireties.

FIELD OF THE INVENTION

This invention relates to measuring performance characteristics of a network used by a computing device such as a battery-powered device such as a smart phone.

BACKGROUND

Commonly, computing devices are capable of wireless communication with networks. It is useful to analyse such wireless interactions, typically for the purpose of adjusting or repairing the network that supports the interactions, in order to enhance the quality of the wireless communications enabled by the network. It is also useful to associate with an analysis of a wireless interaction between a computing device and a network an assessment of the status of the computing device, in order to give context to the analysis. For example, when the strength of a radio signal reaching a computing device from a network is measured, it is valuable to have information about the status of the computing device, such as its geographical location (so that the measurement can be associated with the part of the network serving that location), whether it is indoors or outdoors (which will have an impact on the how the measurement is interpreted) and, in the case where the computing device is mobile, whether or not the device is moving (which again will have an impact on how the measurement is interpreted). A common scenario for such analysis is the wireless interactions between a smart phone and cellular radio communications network for the purpose of allowing the network operator to enhance the performance of the network for the benefit of the user of the smart phone and its other customers besides.

SUMMARY OF THE INVENTION

According to a first aspect of the invention there is provided a method of operating a user equipment (UE) configured for use with a communications network, the method comprising: measuring a network performance characteristic associated with a measurement period; identifying, using historical data, an application on the UE responsible for transmitting data to, and/or receiving data from, the communication network in the measurement period; and associating the identity of the identified application with the network performance characteristic.

In conventional methods, network performance characteristics such as data rate or throughput are reported to the network without an indication of how a UE has been using the network. Different applications executed on the UE use the network in different ways. For example, some applications may transmit or receive large amounts of data (e.g. video player applications); whereas other applications may be light data users (e.g. messaging applications). It has been realised that an understanding of which application/s have been making use of the network allows network performance characteristics to be put in context, and so increases the usefulness and accuracy of measured network performance characteristics.

As one example, if multiple applications are installed on a UE and the user (or the UE itself) switches between these applications, the data rate measured could fluctuate significantly (due to the differing data demands of particular applications). In conventional reporting methods, this fluctuation could be misinterpreted as a poor quality of service or a network problem and not as a natural consequence of user (or device) behaviour. The present method, however, provides the ability to discern real network performance and separate this from actual user or application behaviour.

As another example, the customer satisfaction with the communications network is likely to depend upon the application/s on the UE actually being used be a user. A user may be satisfied by a comparatively low data rate if a light data application (e.g. a messaging application) is being used, but may be dissatisfied by the same data rate if a heavy data application is being used (e.g. a video player application). The present invention therefore allows a network provider to better understand the experience of their customers.

The user equipment may for example be a mobile device such as a mobile telephone. The communications network may be a cellular communications network or a WiFi® network. The method may be performed on the UE (i.e. the method may be a method of characterising the performance of a communications network by a UE), or may be performed by a combination of the UE and the network. For example, the step of measuring the network performance characteristic and the step of associating the identity of the identified application with the network performance characteristic may be performed either by the UE or by the network.

Using historical data allows the method to identify applications that may be responsible for data usage, without requiring access to currently running application information, which may not be available. Historical data is data recorded before the step of identifying the application is performed. For example, the historical data may be stored in a memory of the UE.

The step of identifying an application may comprise identifying an application likely (or most likely) to be responsible for transmitting data to, and/or receiving data from, the communication network in the measurement period.

In some embodiments, identifying the application may comprise identifying a recently active application, for example from a list of recently active applications. In this case, the list of recently active applications forms the historical data. A recently active application may be an application which was active at any point between the beginning of the measurement period and the present time, or between the beginning of the measurement period and the end of the measurement period. The recently active application may be a currently active application, or an application which has been closed. An active application may be one which has been in the foreground of a user interface of the UE.

It may not be possible to determine for certain which application/s was responsible for data use during the measurement period. However, a recently active application may be the most likely candidate for using data in the measurement period, and so provides a best guess of the actual application. If there are multiple recently active applications, the most recently active application may be taken to be the identified application; or it may be determined which application from a plurality of recently active applications is most likely to have used data (or a majority of the data) in the measurement period.

In some embodiments, identifying the recently active application may comprise identifying a recently closed application from a list of recently closed applications. In particular, identifying the application may comprise identifying an application from the list of recently closed applications which closed during or after the measurement period. In this case, the list of recently closed applications forms the historical data.

The UE operating systems (e.g. Android®) may limit access to information about which application/s are currently running on the UE. However, it may be possible to access a list of applications which have recently closed. By identifying a recently closed application, the method may provide a 'best guess' of the application/s responsible for data use in the measurement period. Thus, for example, it may be possible to ascertain that, on the balance of probabilities, a specific application was running and responsible for the last (or a prior) N packets transmitted and/or received from or by the communications network, during (or over) which a certain set of network performance characteristics measurements were made. It is consequently then possible to be able to directly associate these measurement reports and their associated measurement data with an application which was, in all probability, running in the foreground at the time at which the measurements were made.

In some embodiments, identifying the application may comprise identifying the most recently closed application.

In some embodiments, identifying the application may comprise:
   determining a data usage level for the measurement period; and
   identifying a recently active application having a data usage profile corresponding to the data usage level.

The data usage level for the measurement period may be an indication of the amount of data used (transmitted and/or received) by the UE in the measurement period. The data usage level may be a level selected from a data usage classification scheme; for example the data usage level may be classified as 'heavy data use' if an amount of data over a predetermined threshold has be used in the measurement period, or as 'light data use' if the amount of data used is less than the or a second predetermined threshold.

The data usage profile of an application may be an indication of the likely amount of data used (transmitted and/or received) by an application in a given period. The data usage profile may be based on an expected data usage from previous uses of the application, either on the UE or externally. The data usage profile may be a level selected from a data usage profile classification scheme; for example an application may be classified as a 'heavy data user' or a 'light data user'.

Thus an application in the recently closed list may be identified as the most likely candidate for being responsible for data usage in the measurement period by matching the data usage level to the data usage profile of the recently closed applications. This allows the method to more accurately predict which application was responsible.

Furthermore, there may be multiple windows of activity within the measurement period with different data usage levels, corresponding to multiple applications being used during the measurement period. The method may comprise determining a data usage level of each window of activity. Each data usage level may then be matched to a recently closed application having a corresponding data usage profile. Thus the method may enable identification of multiple applications responsible for transmitting/receiving data, and allowing each application to be associated with the network performance characteristic for a corresponding time window of the measurement period.

In some embodiments, determining the data usage level for the measurement period may comprise determining the number of data packets transmitted/received by the UE during the measurement period.

In some embodiments, determining the data usage level for the measurement period may comprise determining the total amount of data transmitted/received by the UE during the measurement period.

In some embodiments, associating the identified application with the network performance characteristic comprises qualifying the network characteristic based on a data usage profile of the identified application. Qualifying the network characteristic may comprise modifying an action that would otherwise have been performed. For example, the step of qualifying may comprise recognising that the network performance characteristic is affected by a heavy data usage application. The network performance characteristic may then be disregarded. The step of qualifying may comprise recognising that a worse than expected network performance characteristic is acceptable for the identified application. For example, low network speeds may be acceptable for low data use applications.

Some embodiments may further comprise the step of reporting, by the UE, the network performance characteristic and identified application to the communications network.

In some such embodiments, the method may further comprise: determining if a reporting criterion is met; and if the reporting criterion is met, performing the step of reporting the network performance characteristic and identified application to the communications network.

In alternative embodiments, the step of identifying the application may also be performed after the determination that the reporting criterion is met.

The reporting criterion may be selected from the group comprising:
   i) the UE has moved more than a predetermined distance;
   ii) the received signal strength indication, RSSI, of the signal received by the UE from the communications network has changed by more than a predetermined amount;
   iii) the data rate or throughput of the signal received by the UE from the communications network has changed by more than a predetermined amount;
   iv) the connection type of the UE to the communication network has changed;
   v) a predetermined amount of time has passed since the step of reporting the reporting the network performance characteristic and the identified application was last performed by the UE;
   vi) a manual network performance test has been run by a user of the UE;
   vii) a predetermined application has been active on the UE;
   viii) a predetermined application has closed on the UE.

In some embodiments, the network performance characteristic may be a data rate at which data is received from or transmitted to the communications network by the UE, and wherein the method further comprises:

determining a data usage profile of the identified application;

determining if the data usage profile matches a predetermined data usage profile; and if so, identifying the measured data rate as the maximum data rate available to the UE during the measurement period.

When a heavy data usage application is run, for example a video player, it is likely that the UE will be demanding the maximum data rate which the network is capable of providing at that time (based upon the amount of congestion on the network and the user's location relative to a basestation). Thus the measured data rate for measurement periods where such an application is running is the maximum speed at which the UE can receive/transmit data—in other words the measured data rate provides a broadband speed test of the network. Advantageously, this 'speed test' is provided without any additional data having to be downloaded to the UE, as the measurement uses data that would be downloaded anyway.

In some embodiments, the network performance characteristic may comprise at least one of: average transmitted data rate, average received data rate, peak transmitted data rate, peak received data rate, received signal strength, packet latency, and packet jitter.

In some embodiments, the method further comprises: determining a data usage metric for the measurement period; and associating the one or more data usage metrics with the network performance characteristic and identified application. The data usage metric may for example comprise at least one of: an amount of data sent by the UE, an amount of data received by the UE, and network latency. The data usage metric may be determined for the whole measurement period, or may be determined for a plurality of points or windows within the measurement period. The step of associating may be performed on the UE, or may be performed by the network after receipt of the network performance characteristic from the UE.

Such embodiments may provide further context to the network performance characteristic, and additional evidence for determining the application responsible for transmitting/receiving data in the measurement period. In embodiments where the data usage metric is determined for a plurality of points/windows in the measurement periods, the data usage metric may also assist in identification of windows of activity corresponding to different applications being used during the measurement period.

In some embodiments, the measurement period may be a period between 0.5 s and 2 s, or between 1 s and 10 s, or between 10 s and 1 minute, or between 1 minute and 10 minutes, or between 10 minutes and 1 hour, or between 1-2 hours, or between 2-24 hours, or more. The network performance characteristic may be sampled at one or more points during the measurement period. The network performance characteristic may be an average of a plurality of measurements in the measurement period, or a single point sample may be used to represent the network performance characteristic in the measurement period.

The method may be a method of monitoring performance of a communications network, the method comprising: measuring, by a user equipment, UE, configured for use with the communications network, a network performance characteristic associated with a measurement period; identifying, by the UE, using historical data, an application on the UE responsible for transmitting data to, and/or receiving data from, the communication network in the measurement period; and associating the identity of the identified application with the network performance characteristic.

According to a second aspect of the invention there is provided a user equipment (UE) for use with a communications network, the UE comprising:

a transmitter for communicating with the communications network; and a processor configured to perform the method of any embodiment of the first aspect.

According to a third aspect of the invention there is provided program code, which when executed by compatible data processing hardware, will cause the hardware to perform a method according to any embodiment of the first aspect.

The invention also relates to apparatus, program code and data carriers non-transiently storing program code for carrying out methods of the kinds described above.

BRIEF DESCRIPTION OF THE DRAWINGS

By way of example only, certain embodiments of the invention shall now be described by reference to the accompanying drawings, in which.

DETAILED DESCRIPTION

Figure 1:
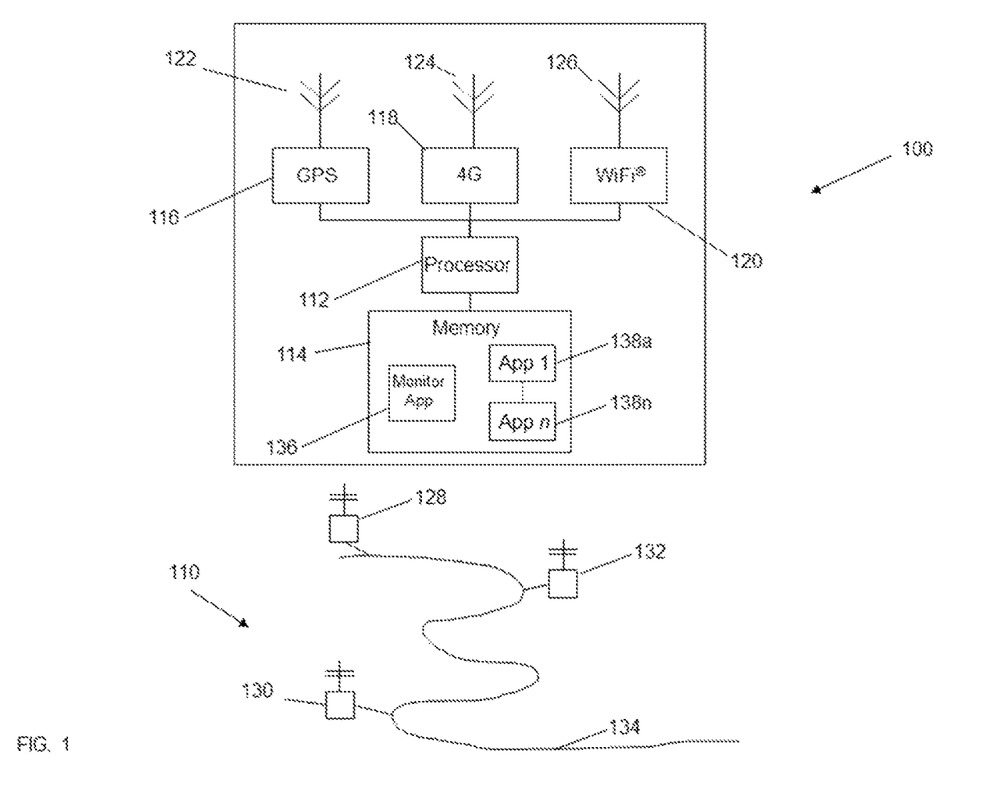
FIG. 1 is a block diagram schematically illustrating a 4G telecommunications network and a user equipment (UE) that can interact with the network.

FIG. 1 illustrates a user equipment (UE) 100 that is a mobile subscriber device—such as a smartphone, for example—that is operating in a 4G cellular telecommunications network 110. The UE 100 comprises a processor 112, a memory 114, a GPS receiver 116, a 4G transceiver 118, a WiFi® transceiver 120 and three antennas 122-126. In practice, of course, the UE comprises many other elements besides, though description of these elements is not necessary to understand the invention as embodied by the devices and processes that are described by reference to the drawings. As shown, the 4G cellular network 110 comprises three base stations 128, 130 and 132 that are interconnected by a backhaul infrastructure 134. Like the UE 100, in practice, the network 110 comprises many other elements besides those shown, though description of these elements—further base stations, for example—is not necessary to understand the invention as embodied by the devices and processes that are described by reference to the drawings.

The processor 112 has overall control of the UE 100 and executes instructions, with the aid of the storage provided by memory 114 to which the processor 112 is operatively coupled, in order to perform such tasks as may be required of the UE 100 by its user and by the operator of the network 110. The processor 112 is operatively coupled to the GPS receiver 116, the 4G transceiver 118, and the WiFi® transceiver 120 in order to control and operate those subsystems.

In order to perform their respective functions, the GPS receiver 116, the 4G transceiver 118, and the WiFi® transceiver 120 are operatively coupled to antennas 122-126 respectively.

The GPS receiver 116 receives signals from overhead GPS satellites (not shown), mathematically estimates the location of the UE 100 from those signals, and reports the estimated location to the processor 112.

The 4G transceiver 118 both transmits radio communications to, and receives radio communications from, the 4G cellular communications network 110. The signals transmitted by the 4G transceiver 118 may contain data generated by the user of the UE 100 and also signalling data—control information, measurement information and the like—that is utilised by the 4G network 110 for the purpose of enabling the network 110 to at least adequately conduct radio communications with its users' UEs. Similarly, the signals received by the 4G transceiver 118 may contain data intended for user consumption—voice-call data or video data, for example—as well as signalling data for enabling the UE 100 to interact efficiently with the 4G network 110.

The WiFi® transceiver 120 both transmits radio communications to, and receives radio communications from, WiFi® access points (not shown) in the vicinity of the UE 100. The signals transmitted by the WiFi® transceiver 120 may contain data generated by the user of the UE 100 and also signalling data that enables or facilitates communication between the WiFi® transceiver 120 and one or more WiFi® access points. Similarly, the signals received by the WiFi® transceiver 120 may contain data intended for user consumption—voice-call data or video data, for example—as well as signalling data that enables or facilitates communication between the WiFi® transceiver 120 and one or more WiFi® access points.

The UE 100 is powered by a battery (not shown) and hence the processor 112 is configured to manage the UE's power consumption. The UE 100 has a selection of operating modes, each with a different power consumption. The processor 112 stops and starts—or, as it is commonly said, wakes and puts to sleep—various subsystems and processes within the UE in order to move between these modes so as to manage overall power consumption and defer the moment at which the user next deems it necessary to charge the battery. Some subsystems and processes are relatively power hungry. The GPS receiver 116, the 4G transceiver 118 and the WiFi® transceiver 120 are relatively power-hungry subsystems, and the processor 112 is arranged to deactivate them under certain conditions in order conserve battery energy. For example, the 4G transceiver 118 can be deactivated or put to sleep upon a predetermined period expiring following the last time that the 4G transceiver 124 was required for communication with the 4G network 110. Even if the user places no demands on the 4G transceiver 124 while 4G transceiver 124 is in sleep mode, the processor 112 will periodically wake the 4G transceiver 124 in order for signalling data to be sent between the UE 100 and the 4G network 110.

Similarly, the WiFi® transceiver 126 can be put to sleep, in the sense that the frequency with which it searches for WiFi® access points in its vicinity is substantially reduced if the number of WiFi® access points that it can detect has been zero for a predetermined threshold period of time or if the UE 100 is placed in a stand-by mode (whether by the UE 100 autonomously or by a command from its user). The operation of the GPS receiver 116 to estimate the UE's location is typically ad hoc upon user request or is on a scheduled basis dictated by software (such as an exercise app, in the case where the UE 100 is a smart phone). In order to control power consumption, scheduled use of the location estimation function can be reduced by reducing the frequency of making location estimates and ad hoc use can be temporarily disabled.

The memory 114 contains inter alia programme code for execution by the processor 112 that constitute one or more applications (apps) 138a-n. Apps 138-n are intended to be used be the user of the UE, such as a messaging app or a video player app. When executed by the processor 112, these apps may appear in the foreground of a graphical user interface of the UE, and may be responsible for transmitting and receiving user-type data (often called payload data) to and from the 4G network 110.

The memory 114 also contains programme code for execution by the processor 112 that constitutes a monitoring app 136 that, at least in part, performs measurements of network performance characteristics on the 4G network 110 for the benefit of the operator of the 4G network 110. Such measurements may, for example, be of the following types.

The time it takes for round-trip communication from the UE 100 to a predetermined network or internet resource (not shown) via the 4G network 110—a so-called latency measurement.

The rate at which user-type data can be transmitted to the 4G network 110 from the UE 100.

The rate at which user-type data can be received from the 4G network 110 by the UE 100.

The error rate in user-type data transmitted between the UE 100 and the 4G network 110.

RSSI of signals received from a 4G transmitter located at a cell site with which the UE is in communication.

The monitoring app 136 communicates the results of such measurements to the operator of the 4G network 110 over the 4G network 110 via the 4G transceiver 118. It is useful for the network operator to know the location in its network where a measurement was made, so that the operator can understand how different areas of its network are performing, and diagnose and remedy any underperformance. Therefore, the monitoring app 136 is configured to transmit each measurement with an indication of the location where the measurement was made, as well as an indication of the time each measurement was made.

In addition, it is useful if the network operator can understand what the dominant (foreground) app was which was running when network performance measurements were taken, as this is useful diagnostic information which can help to identify the source of any problems on the network. It may be that there is no specific problem and the network operator simply wishes to understand more about how his network performs in particular locations, at particular times and when running particular applications. For example a video streaming app, such as YouTube®, will typically generate significant traffic and 'stretch' a network at times of heavy usage. Such apps may provide useful network stress testing, as described in more detail below.

Figure 2:
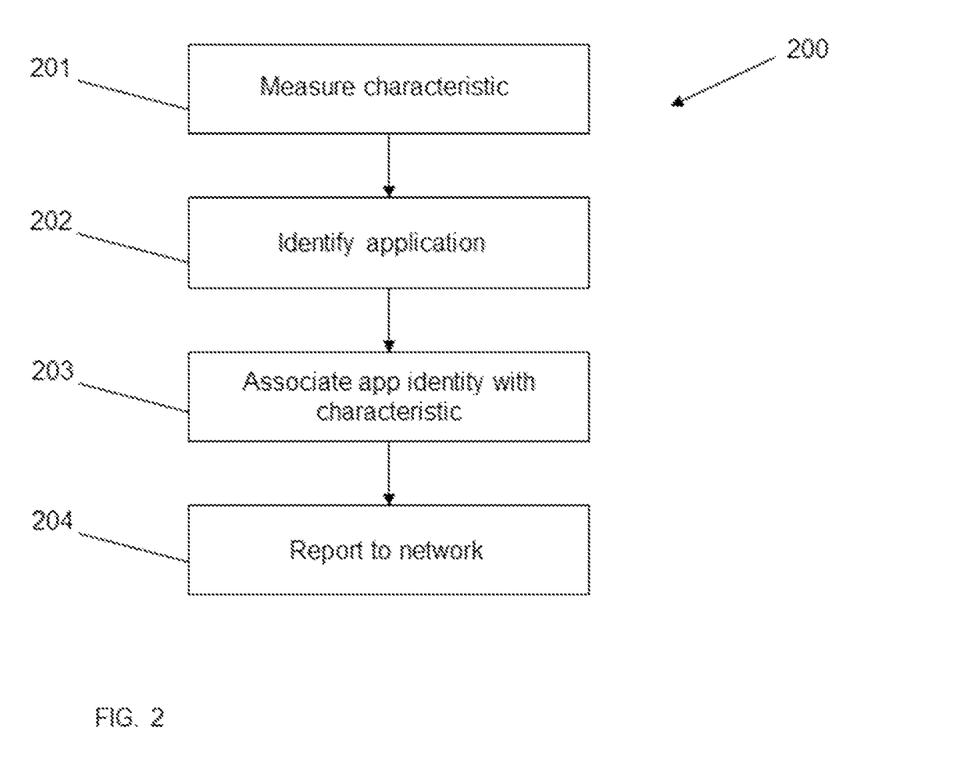
FIG. 2 is a flow chart of a process performed by the UE of FIG. 1 for making measurements on its interactions with the network shown in FIG. 1.

FIG. 2 shows a flow chart of a routine 200 that can be performed by the monitoring app 136 (or more correctly, performed by the processor 112 executing the monitoring app 136) to make the network performance characteristic measurements for the operator of the 4G network 110.

At step 201, a network performance characteristic is measured, as described above. The network performance characteristic is associated with a particular measurement period (e.g. it may comprise an average value for the measurement period, or may be a point measurement used to represent the measurement characteristic for the measurement period). The measurement may be triggered for example if a certain amount of time has elapsed since a previous measurement, or based on a particular location or change of location of the UE, as would be understood by the person skilled in the art.

At step 202, an app 138 from the apps 138a-n is identified as being the dominant app responsible for transmitting data to or receiving data from the 4G network 110 in the measurement period, using historical data. This step may comprise directly identifying an active or recently active app, or identifying a recently closed app, as described in more detail below.

At step 203, the identity of the identified app 138 is associated with the network performance characteristic for the measurement period. The operator of the 4G network 110 may qualify the network performance characteristic based on the identity of the app 138, for example modifying an action that would be taken to correct a perceived network problem based on the identity of the app 138.

Finally, at optional step 204, the network performance characteristic and identity of the identified app are reported to the operator of the 4G network 110. Alternatively, the network performance characteristic and identity of the app 138 may be stored for later analysis or communication to the operator of the 4G network 110.

In some embodiments, the application 138 is identified in step 202 by directly determining whether an app has been recently active (an active app being an app in the foreground of the GUI), for example by comparing the time an app was active with the time of the measurement period. However, such a direct approach is not always possible. Some UE operating systems, such as Android®, prevent the monitoring app 136 from accessing information about which apps 138a-n are currently active. However, when an app 138a-n closes (or is no longer the foreground app), it is possible to interrogate the operating system, (e.g. interrogate the "app database," via UsageStatsManager on Android®) to find out which app it was which has just terminated. It is also possible to ascertain when (at what time) the previous foreground app closed.

Using the list of recently closed apps, and the time at which an app closed, it is reasonable to assume that for the bulk or all of the intervening measurement period, the app 138 which has just terminated was responsible for the bulk of the data sent/received over the mobile network. Thus even though direct access to the identity of active apps 138a-n may be prohibited, an informed guess may be used to identify, at step 202 of the routine 200, an app 138 responsible for the majority of data usage during the measurement period.

Figure 3:
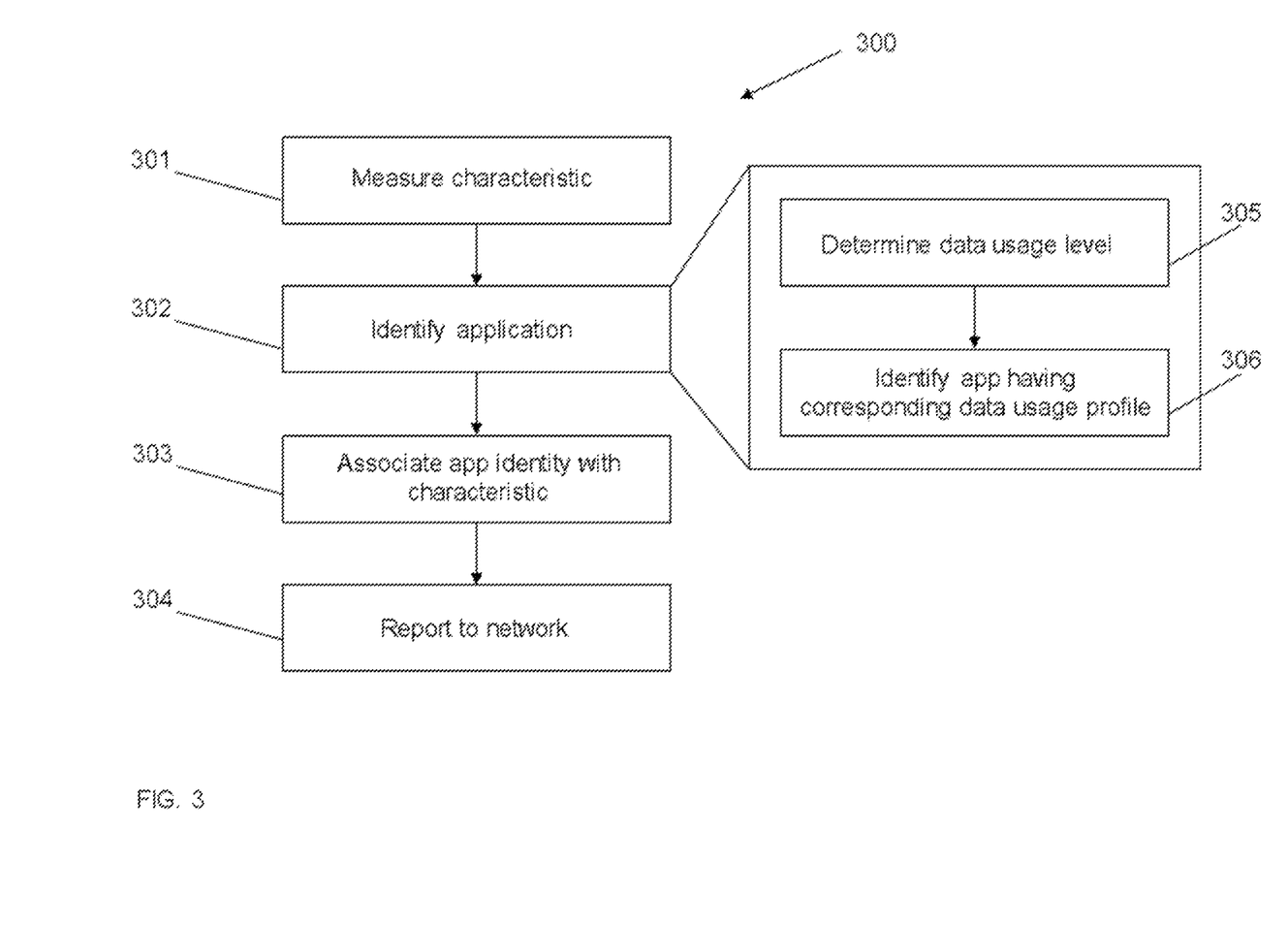
FIG. 3 is a flow chart of an alternative process performed by the UE of FIG. 1 for making measurements on its interactions with the network shown in FIG. 1.

It is also possible to analyse the characteristics of the packets of data transmitted/received during the measurement period themselves to ascertain whether each was likely to have resulted from that particular app 138a-n. FIG. 3 shows an alternative routine 300 performed by the monitoring app 136, in which such an analysis is used.

In FIG. 3, steps 301, 303, and 304 are identical to the corresponding steps 201, 203, and 204 of routine 200 shown in FIG. 2. At step 302 an app 138 responsible for data use during the measurement period is identified, similarly to step 202. However, in this embodiment identifying the app 138 comprises the further steps 305 and 306.

At step 305, a data usage level for the measurement period is determined. The data usage level classifies the data usage during the measurement period based on how many packets were sent and/or received during the measurement period, and the total number of bytes sent and/or received over the cellular (and, optionally, WiFi®) interfaces of the UE. For example the data usage level is classified as 'heavy data use' if an amount of data over a predetermined threshold has been used in the measurement period, or as 'light data use' if the amount of data used is less than the predetermined threshold or a second predetermined threshold. Other classifications may be used.

At step 306, an app 138 having a data usage profile corresponding to the determined data usage level is selected from a list of recently closed apps. The data usage profile of an app classifies its expected data usage. For example an application may be classified as a 'heavy data user' (such as YouTube®) or a 'light data user' (such as a messaging application). If the data usage level during the measurement period was 'heavy data use', then a 'heavy data user' app is selected from the list of recently closed apps. If the average (typical) behaviour of the app approximately matches the actual data use during the measurement period, it is likely that the selected app was responsible for the majority of data use in the measurement period.

Once the app 138 is selected using the steps 305, 306, the process 300 continues to step 303, where the identity of the identified app 138 is associated with the network performance characteristic; and then optionally to step 304, where the collected data is transmitted to the operator of the 4G network 110.

It is possible that multiple apps were used during the measurement period. By dividing the measurement period into a plurality of windows, and performing steps 305 and 306 for each window of the measurement period, it may be possible to identify the different apps that were used. For example, a period of heavy data usage may be followed by a period of light data usage, which may be followed by another period of heavy data usage. If the list of recently closed apps comprises a heavy data user such as a video player, and a light data user such as a messaging app, it can be assumed that the user was initially watching a video on the video player, then switched to the messaging app, then switched back to watching a video. Thus by analysing the data usage level, detailed information can be gathered about how the UE was being used during the measurement period, and so provide a fuller context to the measured network characteristic.

The data usage profile of an app may be determined based on an average data use of the app, either on the UE or externally, or based on the genre of app, e.g. any video player app may be classed as a heavy data user. As well as being useful for identifying the foreground app in step 302 above, the data usage profile can also be used to yield additional information from the network performance characteristic. For example, the fact that the identified app 138 is a heavy data user may be used to estimate a likely user satisfaction with a given network speed/reliability.

As a further example, if an app is classified as a heavy data user, it may be assumed that the UE will be demanding data at the maximum rate which the network 110 is capable of providing at that time (based upon the amount of congestion on the network and the user's location relative to the base-station). A measurement of this data rate (as the network characteristic) effectively provides a 'broadband speed check' style measurement on the network 110, without incurring any additional overhead of 'wasted' data (i.e. data purely generated to measure network speed).

Figure 4:
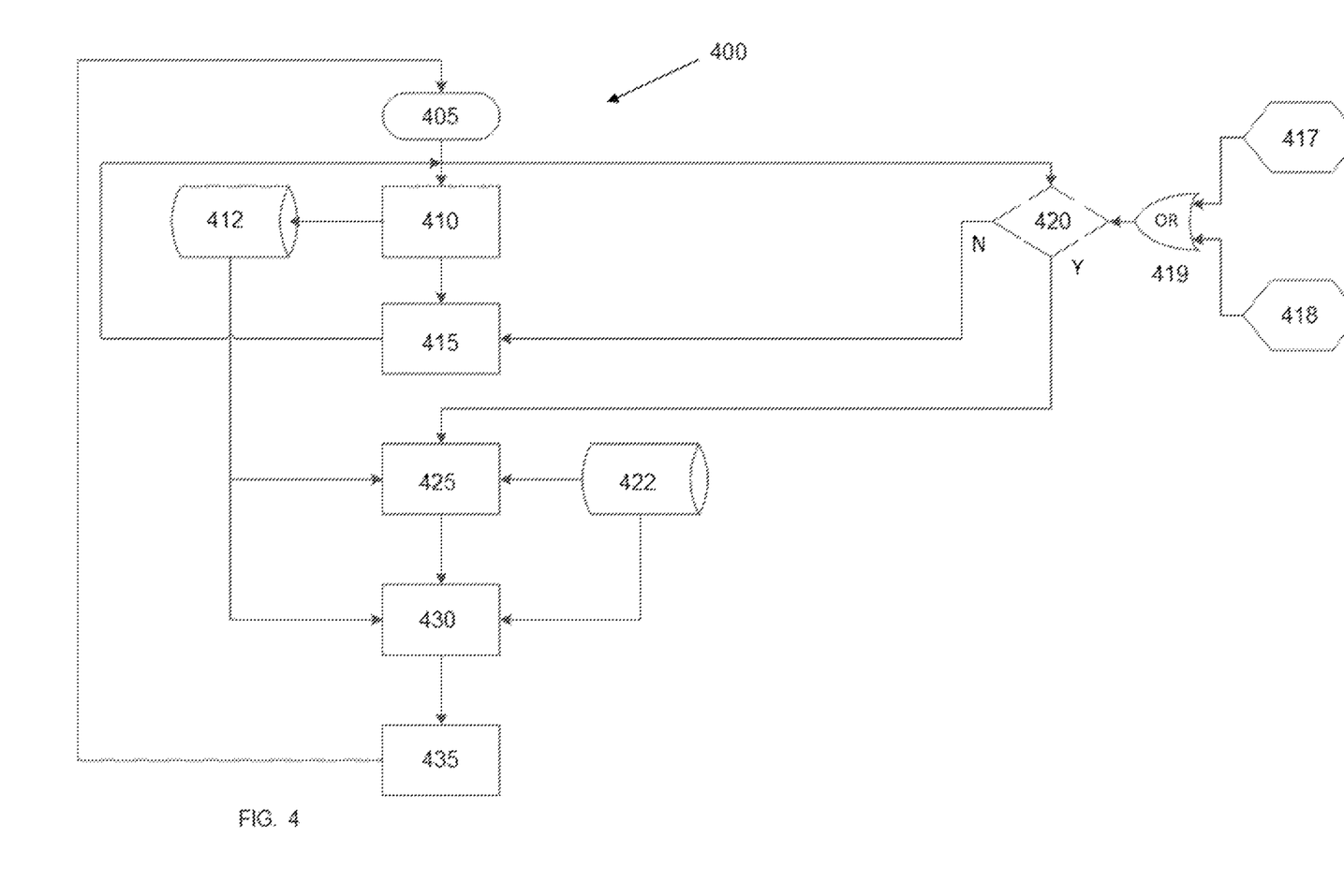
FIG. 4 is a flow chart of a further alternative process performed by the UE of FIG. 1 for making measurements on its interactions with the network shown in FIG. 1.
Figure 5:
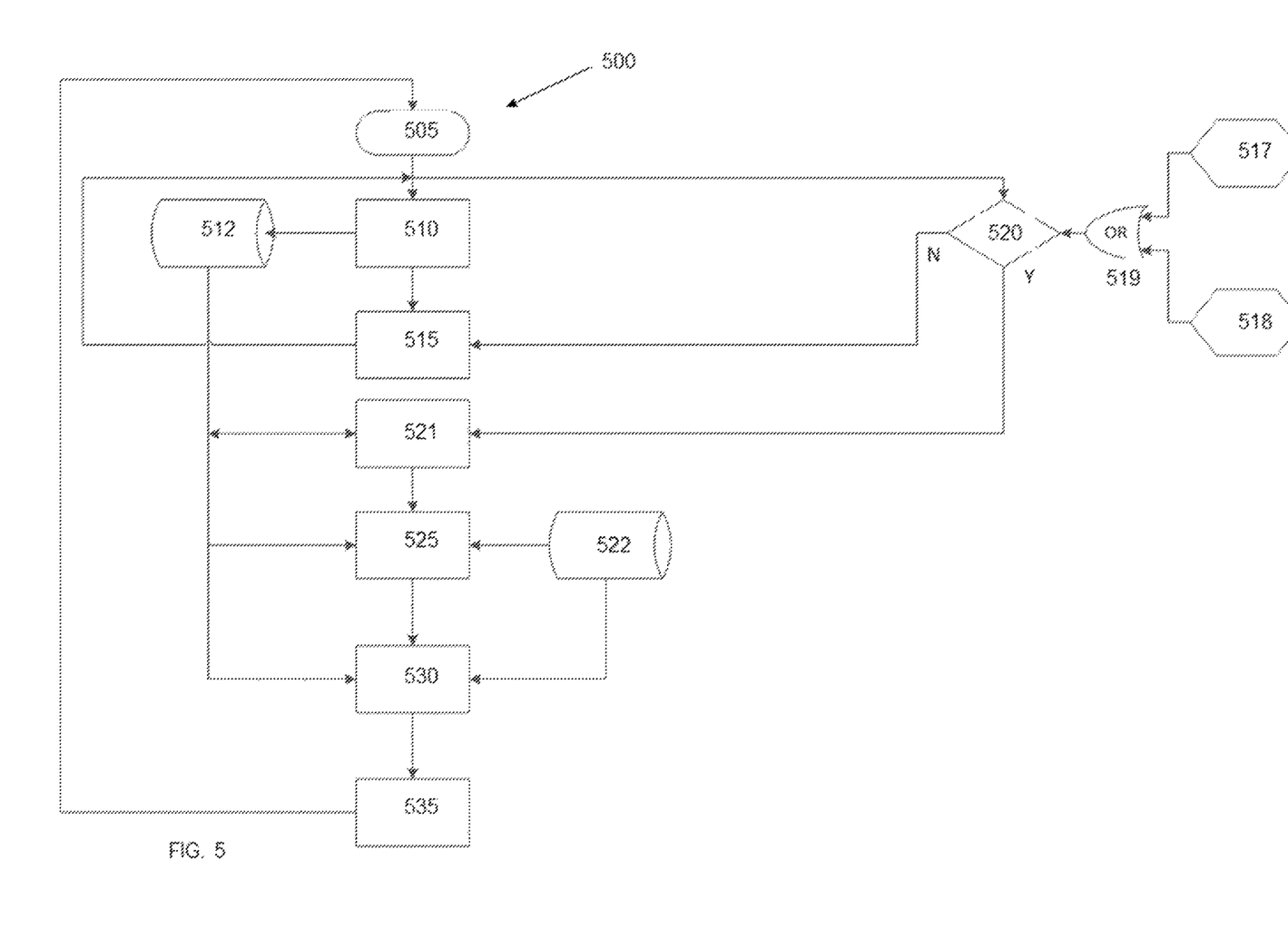
FIG. 5 is a flow chart of a further alternative process performed by the UE of FIG. 1 for making measurements on its interactions with the network shown in FIG. 1.

FIGS. 4 and 5 provide specific examples of how the above processes may be implemented on a UE.

FIG. 4 shows a flowchart of the basic operation of a process 400 which may be performed by the monitoring app 136. The process begins at step 405 and then moves on to steps 410 and 420, in parallel. Considering, first, the path beginning with step 410: step 410 is the first step in a continuously-running loop (operational whilst the monitoring app 136 is operational). In this step, the user device is awoken from a deep-sleep (ultra-low power) state, if it was in such a state at the time, into a low-power state. The process then gathers measurement data from the device recording a network performance characteristic. Additional data, such as location data, e.g. from the UE's GPS receiver, may also be recorded. These data are recorded together with a timestamp for the time at which the data was gathered, in a database 412 stored within the memory 114 of the UE.

Examples of the network characteristics which may be measured and stored include:
- Data-rate (or throughput) at which the UE is loading data from the network 110
- Data rate (or throughput) at which the UE is sending data to the network 110
- Latency and Jitter experienced by packets travelling from and to the UE.

Examples of types of additional data which may be gathered and stored are:
Device data:
- Device identity (e.g. media access control (MAC) address, international mobile subscriber identity (IMSI), international mobile equipment identity (IMEI) or similar identifier(s))
- Brand, model, type allocation code (TAC), memory used/free, storage used/free, CPU usage
- UTC Timestamp, Local device time Connection data:
- Received signal strength indication (RSSI), reference signals received power (RSRP), reference signal received quality (RSRQ), reference signal signal-to-noise ratio (RSSNR), signal-to-noise-plus-interference ratio (SINR), channel quality indicator (CQI), timing advance (TA)
- Cell ID (and/or SSID, if WiFi®) of the cell (or access point) to which the device is connected
- Cell IDs (and/or SSIDs) of any other cells/access points from which the device can receive signals
- Frequency band, absolute radio frequency channel number (ARFCN), location area code (LAC), type allocation code (TAC), mobile country code (MCC), mobile network code (MNC)

Location data:
- Device location (geographic location)
- Speed of movement of the device
- Direction of movement
- Location accuracy
- Whether the UE is (or is likely to be) located indoors or outdoors The process then moves on to step 415 in which the UE returns to its 'deep sleep' state (or other prior state it was in when the current iteration of the continuous loop involving steps 410 and 415 was initiated), and waits for a predetermined period. This period could be short, for example 1-2 seconds, allowing rapid and regular sampling of the activity taking place on the UE and gathering of its associated measurement data, or it could be a longer period of minutes (e.g. 1-2 minutes, 1-5 minutes) or tens of minutes (e.g. 10-20 minutes), perhaps driven by the inclusion of GPS or other location data (without unduly impacting upon battery life), or even longer (hours, days, e.g. 1-2 hours, 1-3 hours, 5 hours, 24 hours, 1-2 days) providing an aggregated user experience. The process then loops back to re-run the loop and, in parallel, re-consider the decision of step 420, which will be discussed below.

At step 420, the process queries whether one or more measurement reports should now be sent to the network. It bases this decision upon whether a measurement criterion has been met. In particular, it bases this decision on two stimuli: timer 417 and event 418. Timer 417 is a timer which outputs a positive stimulus or changes a logic level from logic '0' to logic '1' once a pre-set time interval has elapsed, for example 10 minutes or, in an alternative embodiment, a much shorter period such that a measurement report is sent as soon as it is generated; it then resets to zero and resumes timing another (typically identical) interval. Event stimulus 418 outputs a stimulus or changes a logic level when a given event has taken place. Examples of events any or all of which may be used are:
- The UE having moved greater than a predetermined distance
- The UE having experienced greater than a predetermined change in RSSI
- The UE having experienced greater than a predetermined change in data rate or throughput
- A particular app having been recognised as having been in use (e.g. is actively in use or is identified in the list of recently closed apps)
- The UE having moved into or within a place of interest defined as a polygon boundary around a location
- The network connection having changed e.g. a handover to another cell, the change of radio bearer technology from 4G to 3G, or switching from cellular to WiFi®.
- The user performing a test using a coverage or network status checking app (or any other similar form of app)
- A long-running app having been closed (and hence its identity becoming available, in operating systems which limit access to the active application list).

The outputs of timer 417 and event stimulus 418 feed a logical OR step 419 which yields a positive (logic '1') output in the event that the output from timer 117 is logic '1' or the output from event stimulus 118 is logic '1' or both outputs are logic '1'. The output of logical OR 419, in turn, feeds decision step 420; in the event that logical OR 419 has a positive or logic '1' output, then decision step 420 will conclude that a measurement report should be sent and the method will move on to step 425. Otherwise, if the output of logical OR 419 is negative or zero, then decision step 420 will conclude that a measurement report should not be sent and the method moves to step 415, which has been discussed above.

At step 425, the app 138 which was running in the foreground of the user interface of the UE during the measurement period is identified (as described with respect to steps 202 and 302 in processes 200 and 300 above). In particular, the process interrogates a list of recently closed applications, which lists applications that have closed within a particular time period. If this time period is sufficiently short (for example 10 minutes), then it is possible to make an informed association between the app or apps which were running within the time period and network performance measurements taken during or within that same time period. Such measurements may be aggregated over the time period, as will be discussed in particular in relation to data rate, in association with FIG. 5 below, or may be 'snapshot' measurements of the instantaneous performance taken at a time, or at multiple times, within the measurement period.

The process then moves on to step 430 in which the timestamp and associated measurements are retrieved from the memory 114 and these are combined with data pertaining to the app which was running at the time indicated by the timestamp, which was ascertained in step 425, to form a complete measurement report. Note that it is also possible to 'tag' the identity of the app with the measurement data at a number of points within the process and not just at step 430; for example it could be undertaken within step 410 or step 415. In a further alternative embodiment, it is possible to send the data twice (in, for example, step 435); the first time without an associated app 'tag', with the aim of getting data to the network as quickly as possible, and then, later, re-sending the same data, but this time with app 'tags' attached (once these have been identified). This scenario may be useful when a single app has been in use for a long period (e.g. when the user is watching a video on a video player app); the identity of the running app will not be available until the app has been closed down and, in the video player example, this could be many minutes or tens of minutes and it may be beneficial to send network performance characteristic updates more frequently than this.

Finally, the method moves on to step 435 in which the measurement report formed in step 430 is transmitted to the network 110 by the UE. The method then returns to steps 410 and 420 (in parallel) as before, and repeats until either the measurement app 136 is stopped or the UE turned off.

FIG. 5 shows an alternative flowchart showing a process 500 for calculating the throughput during particular (typically short) time periods, as obtained by a UE when in communication with a network 110, and associating each period with the foreground app which was likely to have been running during the time period in question (i.e. data throughput is the measured network performance characteristic).

The method begins at step 505 and then moves on to steps 510 and 520, in parallel. Considering, first, the path beginning with step 510: step 510 is again the first step in a continuously-running loop (operational whilst the measurement app is operational). In this step, the UE is awoken from a deep-sleep (ultra-low power) state, if it was in such a state at the time, into a low-power state and then gathers measurement data from the device including data on the number of bytes received and sent since the last time measurement data was gathered. It records this data, together with a timestamp for the time at which the data was gathered, in the memory 114 of the UE. Examples of the additional types of data which may be gathered and stored are similar to those discussed above in relation to FIG. 4, above.

The method then moves on to step 515 in which the user device returns to its 'deep sleep' state (or whatever prior state it was in when the current iteration of the continuous loop involving steps 510, 515 was initiated). The method then loops back to re-run the loop and, in parallel, re-consider the decision of step 520, which will be discussed below.

In step 520, the method queries whether one or more measurement reports should now be sent to the network 110. It bases this decision upon two stimuli: timer 517 and event 518. Timer 517 is a timer which outputs a positive stimulus or changes a logic level from logic '0' to logic '1' once a pre-set time interval has elapsed, for example 10 minutes, it then resets to zero and resumes timing another (typically identical) interval. Event stimulus 218 outputs a stimulus or changes a logic level when a given event has taken place. Examples of events are similar to those listed above in relation to FIG. 4.

The outputs of timer 517 and event stimulus 518 feed a logical OR step 519 which will yield a positive (logic '1') output in the event that the output from timer 517 is logic '1' or the output from event stimulus 518 is logic '1' or both outputs are logic '1'. The output of logical OR 519, in turn, feeds decision step 520; in the event that logical OR 519 has a positive or logic '1' output, then decision step 520 will conclude that a measurement report should be sent and the method will move on to step 521. Otherwise, if the output of logical OR 519 is negative or zero, then decision step 520 will conclude that a measurement report should not be sent and the method moves to step 515, which has been discussed above.

At step 521, the data throughput is calculated for each of a plurality of time windows (which may be considered windows within a measurement period, or a plurality of measurement periods), based upon the number of bytes received and/or sent, as recorded by the UE (e.g. derived from Android®'s TrafficStats or NetworkStatsManager). Alternatively or additionally, network latency may be measured for each of the plurality of time windows. Network latency could be measured, for example, using a standard (device-initiated) 'ping' test (either: internet control message protocol (ICMP), transmission control protocol (TCP) or user datagram protocol (UDP)).

The results of the calculations are then stored in a database within the memory 114, and are associated, within the database, with the timestamp of the original measurement upon which the calculation was based. Note that this calculation could alternatively be undertaken by the network 110 once it is in receipt of measurement data and timestamp information from the user device and does not necessarily need to be undertaken on the UE itself.

The process then moves on to step 525 in which the identity of the app which was running at the time indicated by a timestamp retrieved from database 522, is retrieved from the list of recently closed apps, similar to the process discussed above in relation to FIG. 4.

The process then moves on to step 530 in which the timestamp and associated measurements, including the calculated data rate or throughput, are retrieved from the memory 114 and are combined with data pertaining to the app which was running at the time indicated by the timestamp (e.g. the identity of the app, or the data usage profile of the identified app), which was ascertained in step 525, to form a complete measurement report.

Finally, the method moves on to step 535 in which the measurement report formed in step 530 is transmitted to the network by the UE. The method then returns to steps 510 and 520 (in parallel) as before, and repeats until either the measurement app is stopped or the user device turned off.

It is noted that in processes 400 and 500, the active app is only identified when a reporting criterion is met, in advance of reporting the measurements to the network 110. In alternative embodiments, the app may be identified prior to the reporting criterion being met (e.g. each time the network performance characteristic is measured), and the identity of the app stored in the memory 114.

Example embodiments of the invention have been described for the purposes of illustration only, and not to limit the scope of the invention as defined in the appended claims.

The invention claimed is:

1. A method of operating a user equipment (UE) configured for use with a communications network, the method comprising:

recording, over a measurement period, measurement data from the UE, the measurement data relating to a network performance characteristic of the communications network associated with the measurement period, wherein the network performance characteristic is a characteristic associated with the performance of the communication network;

determining a data usage level for the UE for the measurement period, the data usage level being an indication of the amount of data transmitted and/or received by the UE from the communications network during the measurement period;

receiving a plurality of data usage profiles, each data usage profile being associated with a different application of a plurality of applications on the UE and comprising an expected data usage from prior periods in which the application is known to have been in use either on the UE or another device;

comparing the data usage level for the UE for the measurement period with each of the plurality of data usage profiles, and determining which of the plurality of applications on the UE has an associated data usage profile that corresponds to the determined data usage level for the UE over the measurement period; and associating the determined application with the network performance characteristic, wherein associating the determined application with the network performance characteristic comprises assessing the performance of the communications network using the network performance characteristic and the associated data usage profile of the determined application; and determining, based on the associated data usage profile of the determined application, whether the assessed performance of the communications network is a consequence of a possible fault in the communications network.

2. The method of claim 1, wherein determining the application comprises determining a recently active application.

3. The method of claim 2, wherein determining the recently active application comprises identifying a recently closed application from a list of recently closed applications.

4. The method of claim 3, wherein determining the application comprises identifying an application from the list of recently closed applications which closed during or after the measurement period.

5. The method of claim 2, wherein determining the application comprises:
   determining a data usage level for the measurement period; and
   identifying a recently active application having a data usage profile corresponding to the data usage level.

6. The method of claim 5, wherein determining the data usage level for the measurement period comprises:
   determining the number of data packets transmitted/received by the UE during the measurement period; and
   determining the total amount of data transmitted/received by the UE during the measurement period.

7. The method of claim 1, further comprising reporting, by the UE,
   the network performance characteristic and determined application to the communications network.

8. The method of claim 7, wherein the method further comprises:
   determining if a reporting criterion is met; and
   if the reporting criterion is met, performing the step of reporting the network performance characteristic and determined application to the communications network.

9. The method of claim 8, wherein the reporting criterion is one of:
   the UE has moved more than a predetermined distance;
   a received signal strength indication, RSSI, of a signal received by the UE from the communications network has changed by more than a predetermined amount;
   a data rate or throughput of the signal received by the UE from the communications network has changed by more than a predetermined amount;
   a connection type of the UE to the communications network has changed;
   a predetermined amount of time has passed since the step of reporting the network performance characteristic and the determined application was last performed by the UE;
   a manual network performance test has been run by a user of the UE;
   a predetermined application has been active on the UE;
   a predetermined application has closed on the UE.

10. The method of claim 8, wherein the step of determining the application is only performed if a reporting criterion is met.

11. The method of claim 1, wherein the network performance characteristic is a data rate at which data is received from or transmitted to the communications network by the UE, and wherein the method further comprises:
    determining a data usage profile of the determined application;
    determining if the data usage profile matches a predetermined data usage profile; and
    if so, identifying the data rate as the maximum data rate available to the UE during the measurement period.

12. The method of claim 1, wherein the communications network is a cellular radio communications network.

13. The method of claim 1, wherein the network performance characteristic comprises at least one of: average transmitted data rate, average received data rate, peak transmitted data rate, peak received data rate, received signal strength, packet latency, and packet jitter.

14. The method of claim 1, wherein the method further comprises:
    determining a data usage metric for the measurement period; and
    associating the data usage metric with the network performance characteristic and determined application.

15. The method of claim 14, wherein the data usage metric comprises at least one of: an amount of data sent by the UE, an amount of data received by the UE, and network latency.

16. A user equipment (UE) for use with a communications network, the UE comprising:
    a transmitter for communicating with the communications network; and
    a processor configured to perform the following:
        recording, over a measurement period, measurement data from the UE, the measurement data relating to a network performance characteristic of the communications network associated with the measurement period, wherein the network performance characteristic is a characteristic associated with the performance of the communication network;
        determining a data usage level for the UE for the measurement period, the data usage level being an indication of the amount of data transmitted and/or received by the UE from the communications network during the measurement period;

receiving a plurality of data usage profiles, each data usage profile being associated with a different application of a plurality of applications on the UE and comprising an expected data usage from prior periods in which the application is known to have been in use either on the UE or another device;

comparing the data usage level for the UE for the measurement period with each of the plurality of data usage profiles, and determining which of the plurality of applications on the UE has an associated data usage profile that corresponds to the determined data usage level for the UE over the measurement period; and associating the determined application with the network performance characteristic, wherein associating the determined application with the network performance characteristic comprises assessing the performance of the communications network using the network performance characteristic and the associated data usage profile of the determined application; and determining, based on the associated data usage profile of the determined application, whether the assessed performance of the communications network is a consequence of a possible fault in the communications network.

17. A non-transitory storage medium comprising program code thereon, the program code, when executed by compatible data processing hardware, causing the hardware to:

record, over a measurement period, measurement data from a UE, the measurement data relating to a network performance characteristic of a communications network associated with the measurement period, wherein the network performance characteristic is a characteristic associated with the performance of the communication network;

determine a data usage level for the UE for the measurement period, the data usage level being an indication of the amount of data transmitted and/or received by the UE from the communications network during the measurement period;

receive a plurality of data usage profiles, each data usage profile being associated with a different application of a plurality of applications on the UE and comprising an expected data usage from prior periods in which the application is known to have been in use either on the UE or another device;

compare the data usage level for the UE for the measurement period with each of the plurality of data usage profiles, and determine which of the plurality of applications on the UE has an associated data usage profile that corresponds to the determined data usage level for the UE over the measurement period; and associate the determined application with the network performance characteristic, wherein associating the determined application with the network performance characteristic comprises assessing the performance of the communications network using the network performance characteristic and the associated data usage profile of the determined application; and determining, based on the associated data usage profile of the determined application, whether the assessed performance of the communications network is a consequence of a possible fault in the communications network.

* * * * *